(12) United States Patent
Zarringhalam et al.

(10) Patent No.: US 11,970,227 B2
(45) Date of Patent: Apr. 30, 2024

(54) AUTOMATED LATERAL CONTROL OF A VEHICLE WITH ACTIVE COMPENSATION OF TEMPERATURE VARIATION EFFECTS ON STEERING PERFORMANCE

(71) Applicant: GM GLOBAL TECHNOLOGY OPERATIONS LLC, Detroit, MI (US)

(72) Inventors: Reza Zarringhalam, Whitby (CA); Jimmy Lu, Markham (CA); Brian Porto, Wixom, MI (US); Ethan Thomas Dietrich, Oak Park, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 157 days.

(21) Appl. No.: 17/807,439

(22) Filed: Jun. 17, 2022

(65) Prior Publication Data
US 2023/0406406 A1    Dec. 21, 2023

(51) Int. Cl.
*B62D 6/00* (2006.01)
*B62D 5/04* (2006.01)

(52) U.S. Cl.
CPC ............ *B62D 6/00* (2013.01); *B62D 5/0457* (2013.01)

(58) Field of Classification Search
CPC ...... B62D 6/00; B62D 5/0457; B62D 5/0463; B62D 15/025

USPC ......................................... 701/41, 42, 43, 44
See application file for complete search history.

(56) References Cited

FOREIGN PATENT DOCUMENTS

CA     3155591     *  3/2021    ............ B60W 50/00

* cited by examiner

*Primary Examiner* — Hai H Huynh
(74) *Attorney, Agent, or Firm* — Lorenz & Kopf LLP

(57) ABSTRACT

Methods, systems and a vehicle control system for a vehicle is provided. The vehicle control system includes an Electric Power Steering System (EPS), and a sensor system including a vehicle dynamics sensor configured to provide vehicle dynamics data and a temperature sensor configured to provide measured outside temperature. A processor is in operable communication with the EPS and the sensor system. The processor is configured to execute program instructions. The program instructions are configured to cause the processor to: execute an automated lateral control algorithm based on the vehicle dynamics data to generate a steering command, adapt the automated lateral control algorithm based on the measured outside temperature so that the steering command compensates for changing lateral response of the vehicle as a result of changing environmental temperature; and provide the steering command to the EPS, wherein the EPS is configured to laterally control the vehicle based on the steering command.

20 Claims, 5 Drawing Sheets

AUTOMATED LATERAL CONTROL OF A VEHICLE WITH ACTIVE COMPENSATION OF TEMPERATURE VARIATION EFFECTS ON STEERING PERFORMANCE

The present disclosure generally relates to automated lateral control of a vehicle and associated methods and systems.

INTRODUCTION

An autonomous vehicle is a vehicle that is capable of sensing its environment and navigating with little or no user input. An autonomous vehicle senses its environment using sensing devices such as radar, lidar, image sensors, and the like. The autonomous vehicle system further uses information from systems such as global positioning systems (GPS) to navigate. However, it may be desirable to improve control of an autonomous vehicle, for example in controlling steering of an autonomous vehicle.

Vehicle automation has been categorized into numerical levels ranging from Zero, corresponding to no automation with full human control, to Five, corresponding to full automation with no human control. Various automated driver-assistance systems, such as cruise control, adaptive cruise control, lane keeping control, lane centering control and parking assistance systems correspond to lower automation levels, while true "driverless" vehicles correspond to higher automation levels. Various automated driver assistance systems of different automation levels rely on effective lateral control of the vehicle.

It has been found by the present inventors that colder temperatures may cause significant performance degradation in terms of steering control performance for automated driving. In particular, lateral response may be degraded at colder temperatures than a temperature at which lateral control algorithms used by a vehicle have been calibrated. Lateral tracking of a desired path may be significantly impaired at varying temperatures.

Accordingly, it is desirable to provide techniques for automated lateral control of a vehicle that are equally effective at varying temperatures. It is also desirable to provide methods, systems, and vehicles utilizing such techniques in a processing efficient manner. Furthermore, other desirable features and characteristics of the present invention will be apparent from the subsequent detailed description and the appended claims, taken in conjunction with the accompanying drawings and the foregoing technical field and background.

SUMMARY

In one aspect, a vehicle control system for a vehicle is provided. The vehicle control system includes an Electric Power Steering System (EPS), and a sensor system including a vehicle dynamics sensor configured to provide vehicle dynamics data and a temperature sensor configured to provide measured outside temperature. A processor is in operable communication with the EPS and the sensor system. The processor is configured to execute program instructions. The program instructions are configured to cause the processor to: execute an automated lateral control algorithm based on the vehicle dynamics data to generate a steering command, adapt the automated lateral control algorithm based on the measured outside temperature so that the steering command compensates for changing lateral response of the vehicle as a result of changing environmental temperature; and provide the steering command to the EPS, wherein the EPS is configured to laterally control the vehicle based on the steering command.

In embodiments, the sensor system includes a perception sensor providing perception data. The program instructions are configured to cause the processor to execute a path planning algorithm to determine a commanded trajectory based on the perception data, and execute a trajectory and steering control algorithm as part of the automated lateral control algorithm that generates the steering command based on the commanded trajectory. Adapting the automated lateral control algorithm includes adapting the trajectory and steering control algorithm based on the measured outside temperature so that the steering command compensates for changing lateral response of the vehicle as a result of changing environmental temperature.

In embodiments, the trajectory and steering control algorithm includes a trajectory control algorithm configured to provide a target hand wheel angle based on the commanded trajectory and a steering angle controller configured to provide a commanded torque or commanded hand wheel angle to the EPS based on the target hand wheel angle.

In embodiments, adapting the automated lateral control algorithm based on the measured outside temperature includes gain scheduling.

In embodiments, the automated lateral control algorithm utilizes a vehicle dynamics model to generate the steering command. Adapting the automated lateral control algorithm based on the measured outside temperature includes adapting the vehicle dynamics model.

In embodiments, a boost linearizer function is configured to make linear a non-linear steering assist booster of the EPS, wherein adapting the automated lateral control algorithm based on the measured outside temperature includes adapting the boost linearizer function.

In embodiments, adapting the automated lateral control algorithm based on the measured outside temperature includes obtaining temperature compensated parameters for use by the automated lateral control algorithm that vary based on the measured outside temperature.

In embodiments, the lateral control algorithm includes a feedforward and a feedback control loop and wherein adapting the automated lateral control algorithm based on the measured outside temperature includes adapting of the feedforward and the feedback control loops.

In embodiments, the sensor system measures a driver applied steering torque and the automated lateral control algorithm determines a boosted torque based on the driver applied steering torque, wherein providing the steering command to the EPS includes providing the boosted torque.

In another aspect, a method of controlling a vehicle is provided. The vehicle includes an Electric Power Steering System (EPS), a sensor system including a vehicle dynamics sensor providing vehicle dynamics data and a temperature sensor providing measured outside temperature. The method includes executing, via a processor, an automated lateral control algorithm based on the vehicle dynamics data to generate a steering command, adapting, via the processor, the automated lateral control algorithm based on the measured outside temperature so that the steering command compensates for changing lateral response of the vehicle as a result of changing environmental temperature; and providing, via the processor, the steering command to the EPS, wherein the EPS laterally controls the vehicle based on the steering command.

In embodiments, the sensor system includes a perception sensor providing perception data. The method includes executing, via the processor, a path planning algorithm to determine a commanded trajectory based on the perception data, and executing, via the processor, a trajectory and steering control algorithm as part of the automated lateral control algorithm that generates the steering command based on the commanded trajectory. Adapting the automated lateral control algorithm includes adapting the trajectory and steering control algorithm based on the measured outside temperature so that the steering command compensates for changing lateral response of the vehicle as a result of changing environmental temperature.

In embodiments, the trajectory and steering control algorithm includes a trajectory control algorithm providing a target hand wheel angle based on the commanded trajectory and a steering angle controller providing a commanded torque or commanded hand wheel angle to the EPS based on the target hand wheel angle.

In embodiments, adapting the automated lateral control algorithm based on the measured outside temperature includes gain scheduling.

In embodiments, the automated lateral control algorithm utilizes a vehicle dynamics model to generate the steering command. Adapting the automated lateral control algorithm based on the measured outside temperature includes adapting the vehicle dynamics model.

In embodiments, the method comprises utilizing a boost linearizer function to make linear a non-linear steering assist booster of the EPS, wherein adapting the automated lateral control algorithm based on the measured outside temperature includes adapting the boost linearizer function In embodiments, adapting the automated lateral control algorithm based on the measured outside temperature includes obtaining temperature compensated parameters for use by the automated lateral control algorithm that vary based on the measured outside temperature.

In embodiments, the lateral control algorithm includes a feedforward and a feedback control loop and wherein adapting the automated lateral control algorithm based on the measured outside temperature includes adapting of the feedforward and the feedback control loops.

In embodiments, the sensor system measures a driver applied steering torque and the automated lateral control algorithm determines a boosted torque based on the driver applied steering torque. Providing the steering command to the EPS includes providing the boosted torque.

In embodiments, the lateral response of the vehicle changes with environmental temperature as a result of, at least in part, change in viscosity of lubricants and change in friction along a steering chain from a steering actuator to wheels of the vehicle and change in tire pressure.

In another aspect, a vehicle is provided. The vehicle includes an Electric Power Steering System (EPS), a sensor system including a vehicle dynamics sensor configured to provide vehicle dynamics data and a temperature sensor configured to provide measured outside temperature, and a processor in operable communication with the EPS and the sensor system. The processor is configured to execute program instructions. The program instructions are configured to cause the processor to: execute an automated lateral control algorithm based on the vehicle dynamics data to generate a steering command, adapt the automated lateral control algorithm based on the measured outside temperature so that the steering command compensates for changing lateral response of the vehicle as a result of changing environmental temperature, and provide the steering command to the EPS, wherein the EPS is configured to laterally control the vehicle based on the steering command.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
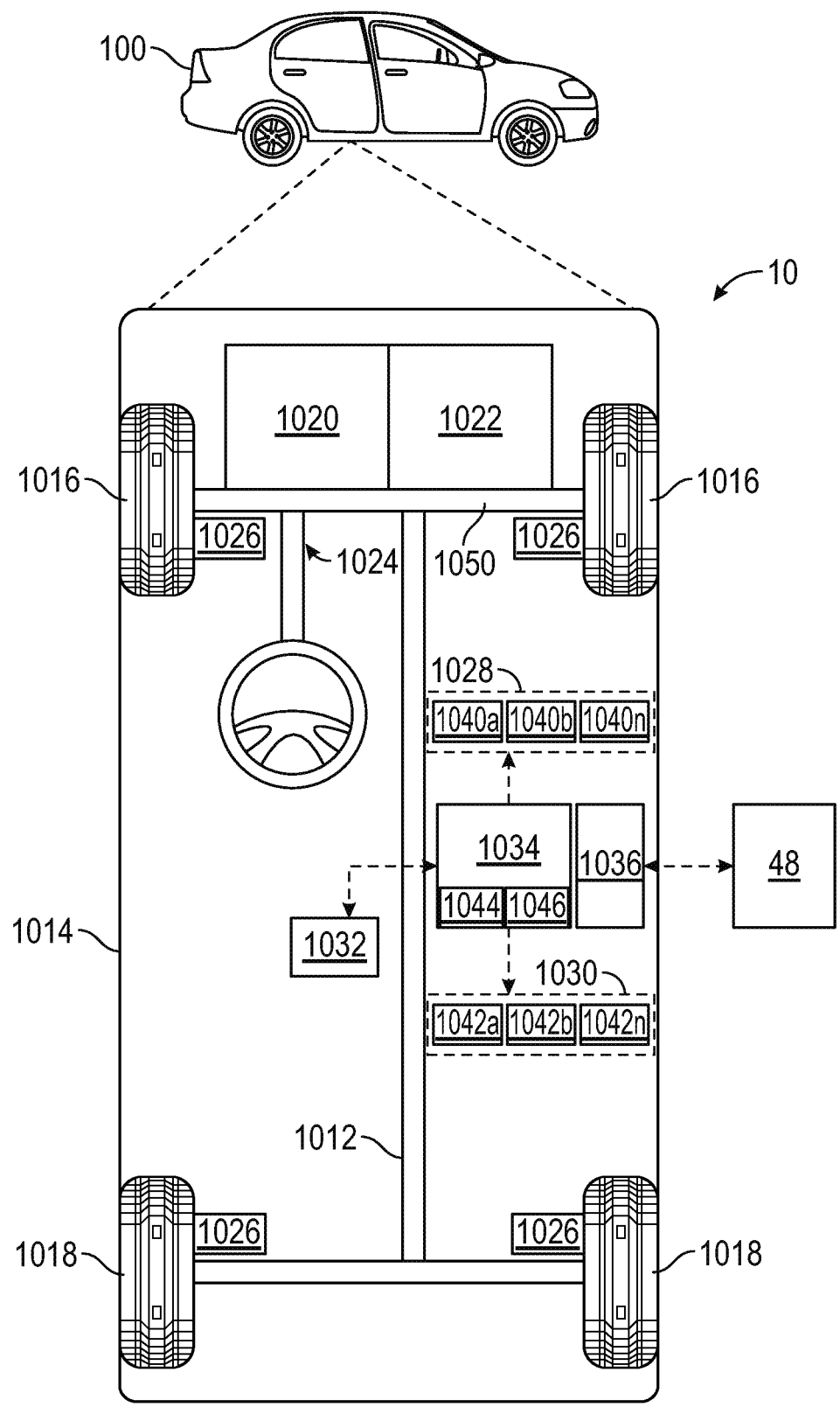
FIG. 1 is a functional block diagram illustrating a vehicle having a lateral vehicle control system, in accordance with various embodiments.

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Systems and methods of autonomous lateral control are described herein that have active compensation of temperature variation effects on steering performance. A method to compensate for temperature variations is described that provides robust automated lateral control performance across a use temperature spectrum. Experimental results have shown noticeable degradation in target path tracking performance in cold weather using calibrations tuned during warmer months. To address the issue, the systems and methods monitor the outside air temperature (OAT) plus drive cycle characteristics and adapt a lateral control algorithm to achieve accurate path tracking performance despite temperature variations. Control adaptation may be performed using one or more of adapting a steering dynamics model and modifying closed-loop steering control gains, and adaptation of feedforward boost-linearization of torque command. The proposed systems and methods can achieve desirable lateral control performance for torque-based control features (e.g. Lane Keeping Assist, Lane Centering Assist, Hands Free Automated Driving, Fully Autonomous Self Driving and Park Assist features. Further, the systems and methods are useful in higher autonomation systems and Electric Power Steering (EPS) systems.

Described herein are systems and methods to compensate for effects of temperature on automated driving lateral control performance through monitoring and reacting to the outside air temperature. An adaptive control algorithm may be provided with closed loop compensation of temperature effects in steering control feedforward and feedback loops. Steering dynamics model parameters may additionally, or alternately, be adapted with respect to temperature variations. Autonomous steering control commands may additionally, or alternately, be adapted based on temperature variations to achieve path-tracking accuracy. Further described is a method to characterize performance of automated steering functions against temperature variations. Yet further, a method to adapt the boost behavior of an EPS system is disclosed that can achieve a consistent actuation performance for various temperatures. Also described is a systematic method to calibrate automated steering functions across the temperature spectrum. As such, a method for temperature-agnostic automated steering control is provide that are operable with both torque and angle command interfaces.

In embodiments, methods and systems to achieve a consistent steering performance across the temperature spectrum are provided through active compensation for temperature effects on an actuation effort. In one embodiment, variations in boost behavior of a steering actuator are compensated for in a feedforward control loop through a boost linearizer block that monitors the outside temperature. A control command is passed through an adaptive boost function to deliver a homogenous performance, e.g. a consistent vehicle level lateral acceleration as a function of command torque despite temperature variations.

A method and test procedure is provided to characterize sensitivity of the automated steering system to temperature variations. The test procedure is designed to identify impacts of temperature on capability of steering mechanism to induce vehicle lateral acceleration in response to torque commands. The results are used to tune controller gains offline and achieve a desirable real-time performance across the temperature spectrum. The tuned controller gains may be stored with respect to temperature for adaptation of a lateral vehicle control algorithm using adapted gains depending on a measured OAT.

In embodiments, a method is disclosed to calibrate the automated steering controller for operations in various temperatures. A minimal set of calibrations on the downstream control blocks are designed to regulate the command and compensate for temperature effects, while most of the trajectory tracking and steering tracking calibrations are maintained intact for all driving scenarios. This reduces calibration effort and test scenarios for tuning automated driving features.

In embodiments, method and systems described herein adapt parameters of the steering dynamics model as functions of temperature for model-based control systems. Stiffness and damping gains of the plant model are identified offline as functions of temperature through parameter identification methods. The adaptive model is then used online to provide accurate representation of steering dynamics for closed loop control.

In yet further embodiments, method and systems described herein adapt the boost behavior of the EPS system to temperature variations for manual driving. The temperature compensator modifies EPS boost curves as a function of the OAT sensor readings. As a result, driver commands are boosted differently for various temperatures to maintain a consistent steering feel in various temperatures.

With reference to FIG. 1, a vehicle control system shown generally at 10 is associated with a vehicle 100 in accordance with various embodiments. In general, the lateral vehicle control system 10 adapts a lateral controller based on OAT so that a steering command is adjusted to compensate for effects of temperature variation on lateral acceleration response of the vehicle to a nominal steering command.

As depicted in FIG. 1, the vehicle 100 generally includes a chassis 1012, a body 1014, front wheels 1016, and rear wheels 1018. The body 1014 is arranged on the chassis 1012 and substantially encloses components of the vehicle 100. The body 1014 and the chassis 1012 may jointly form a frame. The wheels 1016-1018 are each rotationally coupled to the chassis 1012 near a respective corner of the body 1014.

In various embodiments, the vehicle 100 is an autonomous vehicle and the lateral vehicle control system 10 is incorporated into the vehicle 100 (hereinafter referred to as the vehicle 100). In other embodiments, the vehicle 100 is a semi-autonomous vehicle having automated features of an Advanced Driver Assistance System (ADAS) that relies on lateral vehicle control (such as lane keeping assistance and hands off driving). In other embodiments, the vehicle 100 includes an EPS system 80 that is adapted to vary a boost effect based on OAT as an input additional to driver applied torque and hand wheel angle so that the EPS feel is consistent despite OAT variations. The vehicle 100 is, for example, a vehicle that is automatically controlled to carry passengers from one location to another. The vehicle 100 is depicted in the illustrated embodiment as a passenger car, but it should be appreciated that any other vehicle including trucks, sport utility vehicles (SUVs), recreational vehicles (RVs), etc., can also be used.

In an exemplary embodiment, the vehicle 100 is a so-called Level Two, Level Three, Level Four or Level Five automation system. Level two automation means the vehicle assists the driver in various driving tasks with driver supervision. Level three automation means the vehicle can take over all driving functions under certain circumstances. All major functions are automated, including braking, steering, and acceleration. At this level, the driver can fully disengage until the vehicle tells the driver otherwise. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the vehicle 100 generally includes a propulsion system 1020, a transmission system 1022, a steering system 1024, a braking system 1026, a sensing system 1028, an actuator system 1030, at least one data storage device 1032, at least one controller 1034, and a communication system 1036. The propulsion system 1020 may, in various embodiments, include an internal combustion engine, an electric machine such as a traction motor, and/or a fuel cell propulsion system. The transmission system 1022 is configured to transmit power from the propulsion system 1020 to the vehicle wheels 1016-1018 according to selectable speed ratios. According to various embodiments, the transmission system 1022 may include a step-ratio automatic transmission, a continuously-variable transmission, or other appropriate transmission. The braking system 1026 is configured to provide braking torque to the vehicle wheels 1016-1018. The braking system 1026 may, in various embodiments, include friction brakes, brake by wire, a regenerative braking system such as an electric machine, and/or other appropriate braking systems.

The steering system 1024 influences a position of the of the vehicle wheels 1016-1018. While depicted as including a steering wheel for illustrative purposes, in some embodiments contemplated within the scope of the present disclosure, the steering system 1024 may not include a steering wheel. The steering system 1024 may include an EPS system 80 (see FIG. 3). In some embodiments, the EPS system 80 has an electric steering motor mounted to an axle 1050 that provides electric steering assist in response to a vehicle driver turning the steering wheel in a manner that is well understood in the art. In other words, when the vehicle driver turns the steering wheel, the EPS system 80 turns the wheels 1016 and 1018 the amount commanded by the vehicle driver so that the turning of the wheels 1016 and 1018 on the roadway is easier. As would be well understood by one of ordinary skill in the art, the EPS system 80 electrically assists a driver in the steering of the vehicle by applying a variable motor torque command to the steering motor and, as needed, a torque overlay command (TOC) that alters the value of the motor torque command during an EPS-assisted steering maneuver. In other, or combination, embodiments, a motor of the EPS system 80 provides the steering torque for collision avoidance steering, lane keeping assist and other ADAS features described herein and also for autonomous driving steering depending on the application and the level of autonomy of the vehicle 100. In one embodiment, the EPS system 80 is responsive to instructions from a controller 1034 and is configured to provide overall EPS system 80 control.

Figure 3:
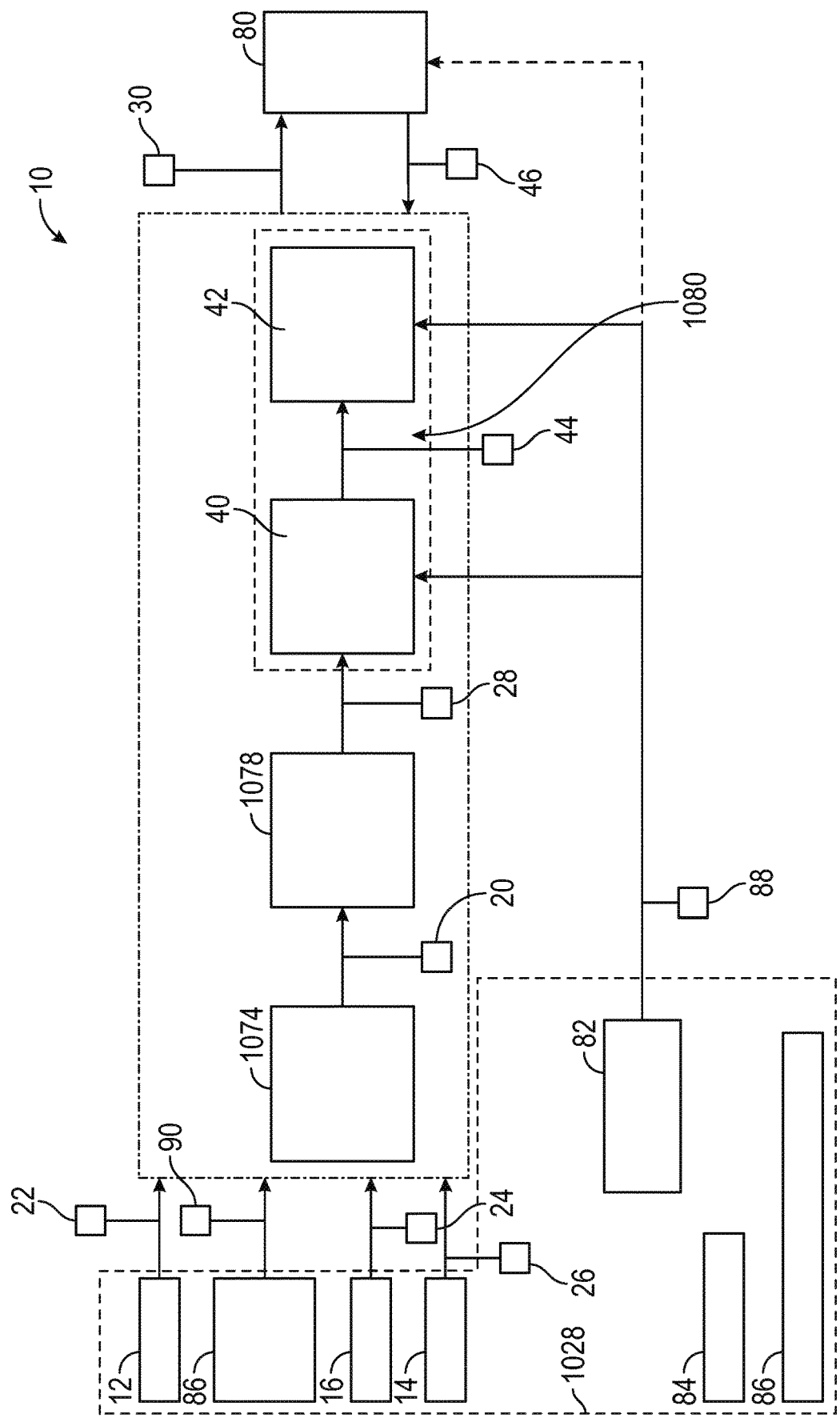
FIG. 3 is a diagram of a lateral vehicle control system, in accordance with various embodiments.

The sensing system 1028 includes one or more sensing devices 1040a-1040n that sense observable conditions of the exterior environment and/or the interior environment of the vehicle 100. The sensing devices 1040a-40n can include, but are not limited to, radars, lidars, global positioning systems, optical cameras, thermal cameras, ultrasonic sensors, and/or other sensors. With reference to FIG. 3, the sensing system 1028 includes a temperature sensor 82 providing measured outside temperature, which is a reading of OAT. The sensing system 1028 includes a HWA (Hand Wheel Angle or Road Wheel Angle) sensor 84 that provides a measure of Hand Wheel Angle. The HWA sensor may be a steering angle sensor mounted to a steering column that measures the rotation of the steering wheel 1024 and the steering column and provides a steering angle signal indicative of same. A driver applied torque sensor may be mounted to the steering column that measures the torque on the steering column and provides a torque signal indicative of same. Alternately, instead of using a steering angle sensor to provide the steering angle, a pinion angle (PA) sensor can be employed to provide the steering angle, which gives a more direct measurement of road wheel angle, as is well understood by those skilled in the art.

The vehicle dynamics sensors 86 provide vehicle dynamics data 90 including longitudinal speed, yaw rate, lateral acceleration, longitudinal acceleration, etc. The vehicle dynamics sensors 86 may include wheel sensors that measure information pertaining to one or more wheels of the vehicle 100. In one embodiment, the wheel sensors comprise wheel speed sensors that are coupled to each of the wheels of the vehicle 100. Further, the vehicle dynamics sensors 86 may include one or more accelerometers (provided as part of an Inertial Measurement Unit (IMU)) that measure information pertaining to an acceleration of the vehicle 100. In various embodiments, the accelerometers measure one or more acceleration values for the vehicle 100, including latitudinal and longitudinal acceleration and yaw rate.

The actuator system 1030 includes one or more actuator devices 42a-42n that control one or more vehicle features such as, but not limited to, the propulsion system 1020, the transmission system 1022, the steering system 1024, and the braking system 1026. In various embodiments, the vehicle features can further include interior and/or exterior vehicle features such as, but are not limited to, doors, a trunk, and cabin features such as air, music, lighting, etc. (not numbered).

The communication system 1036 is configured to wirelessly communicate information to and from other entities 1048, such as but not limited to, other vehicles ("V2V" communication,) infrastructure ("V2I" communication), remote systems, and/or personal devices. In an exemplary embodiment, the communication system 1036 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 1032 stores data for use in automatically controlling the vehicle 100. In various embodiments, the data storage device 1032 stores defined maps of the navigable environment. In various embodiments, the defined maps may be predefined by and obtained from a remote system. For example, the defined maps may be assembled by the remote system and communicated to the vehicle 100 (wirelessly and/or in a wired manner) and stored in the data storage device 1032. As can be appreciated, the data storage device 1032 may be part of the controller 1034, separate from the controller 1034, or part of the controller 1034 and part of a separate system.

The controller 1034 includes at least one processor 1044 and a computer readable storage device or media 1046. The processor 1044 can be any custom made or commercially available processor, a central processing unit (CPU), a graphics processing unit (GPU), an auxiliary processor among several processors associated with the controller 1034, a semiconductor based microprocessor (in the form of a microchip or chip set), a macroprocessor, any combination thereof, or generally any device for executing instructions. The computer readable storage device or media 1046 may include volatile and nonvolatile storage in read-only memory (ROM), random-access memory (RAM), and keep-alive memory (KAM), for example. KAM is a persistent or non-volatile memory that may be used to store various operating variables while the processor 1044 is powered down. The computer-readable storage device or media 1046 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 1034 in controlling the vehicle 100.

The instructions may include one or more separate programs, each of which comprises an ordered listing of executable instructions for implementing logical functions. The instructions, when executed by the processor 1044, receive and process signals from the sensing system 1028, perform logic, calculations, methods and/or algorithms for automatically controlling the components of the vehicle 100, and generate control signals to the actuator system 1030 to automatically control the components of the vehicle 100 based on the logic, calculations, methods, and/or algorithms. Although only one controller 1034 is shown in FIG. 1, embodiments of the vehicle 100 can include any number of controllers 1034 that communicate over any suitable communication medium or a combination of communication mediums and that cooperate to process the sensor signals, perform logic, calculations, methods, and/or algorithms, and generate control signals to automatically control features of the vehicle 100.

Figure 4:
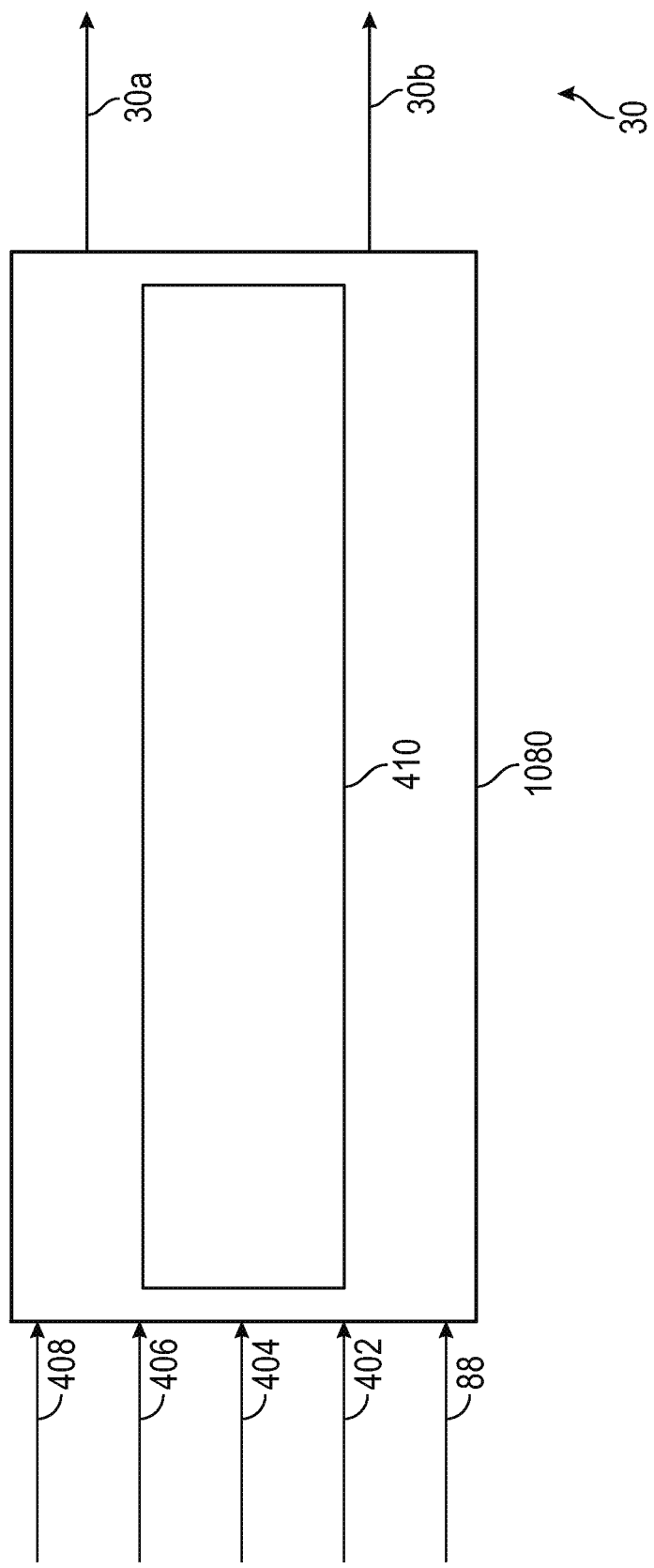
FIG. 4 is a schematic depiction of a trajectory and steering control used in the lateral vehicle control system, in accordance with an exemplary embodiment.
Figure 5:
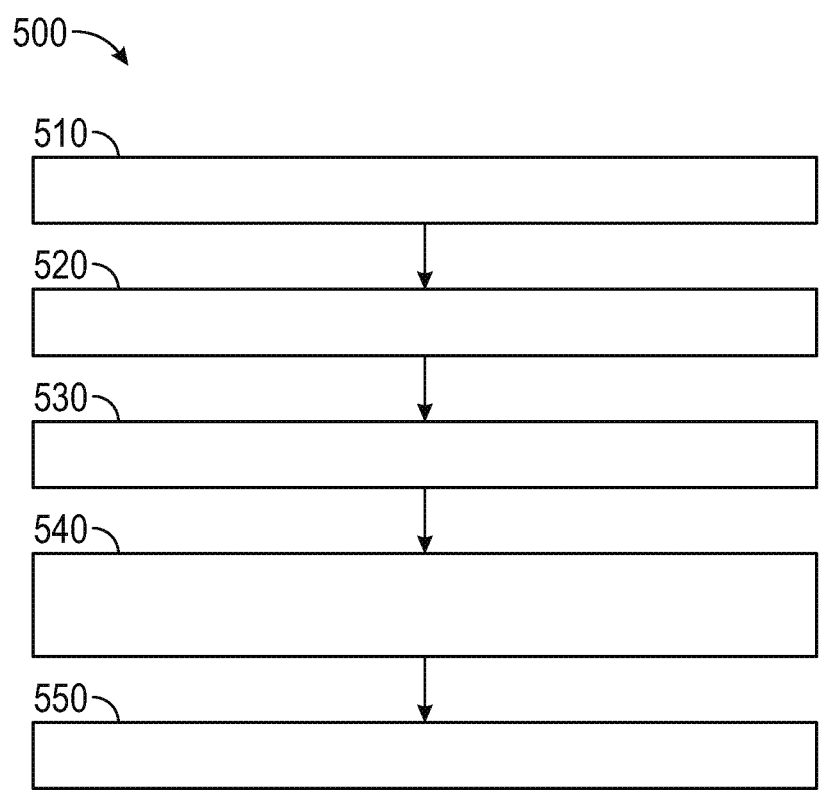
FIG. 5 is a flowchart illustrating a lateral vehicle control method for controlling the vehicle, in accordance with various embodiments.

In various embodiments, one or more instructions of the controller 1034 are embodied in the lateral vehicle control system 10 and, when executed by the processor 1044, implement the lateral vehicle control system 10 described with respect to FIG. 3, The trajectory and steering controller 1080 described with respect to FIG. 4 and method steps as described with respect to FIG. 5. In particular, the instructions of the controller 1034 adapt parameters, algorithms and gains used by a trajectory and steering controller in response to OAT.

Figure 2:
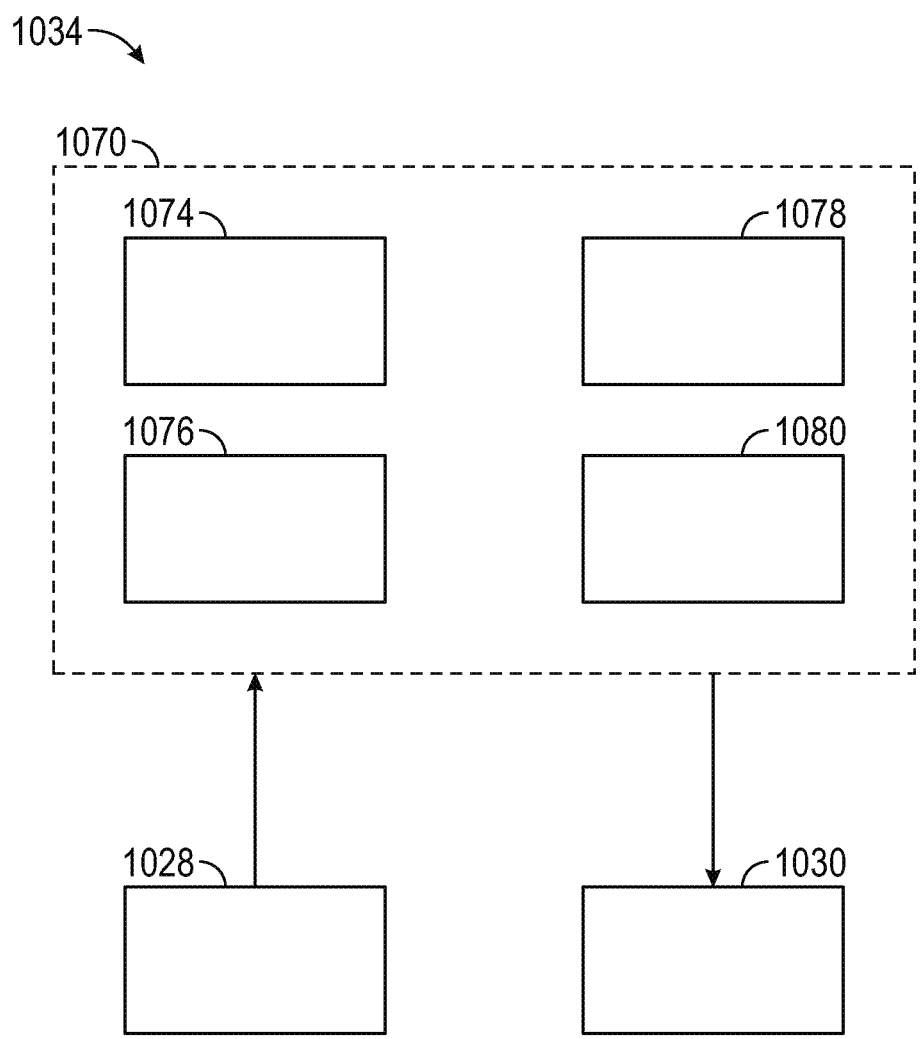
FIG. 2 is a dataflow diagram illustrating an autonomous driving system that includes the lateral vehicle control system, in accordance with various embodiments.

In accordance with various embodiments, controller 1034 implements an Advanced Driver Assistance System (ADAS) 1070 as shown in FIG. 2. That is, suitable software and/or hardware components of controller 1034 (e.g., processor 1044 and computer-readable storage device 1046) are utilized to provide an ADAS 1070 that is used in conjunction with vehicle 100.

In various embodiments, the instructions of the ADAS 1070 may be organized by function or system. For example, as shown in FIG. 2, the ADAS 1070 can include a perception and sensor fusion system 1074, a positioning system 1076, a path planning system 1078, and a trajectory and steering controller 1080. As can be appreciated, in various embodiments, the instructions may be organized into any number of systems (e.g., combined, further partitioned, etc.) as the disclosure is not limited to the present examples.

In various embodiments, the perception and sensor fusion system 1074 synthesizes and processes sensor data and predicts the presence, location, classification, and/or path of objects and features of the environment of the vehicle 100. In various embodiments, the perception and sensor fusion system 1074 can incorporate information from multiple sensors, as shown in FIG. 3, including but not limited to cameras 12, lidars 14, radars, and/or any number of other types of sensors.

The positioning system 1076 processes sensor data along with other data to determine a position (e.g., a local position relative to a map, an exact position relative to lane of a road, vehicle heading, velocity, etc.) of the vehicle 100 relative to the environment. The path planning system 1078 processes sensor data along with other data to determine a path for the vehicle 100 to follow. The trajectory and steering controller 1080 generates control signals for controlling the vehicle 100 according to the determined path.

In various embodiments, the controller 1034 implements machine learning techniques to assist the functionality of the controller 1034, such as feature detection/classification, obstruction mitigation, route traversal, mapping, sensor integration, ground-truth determination, and the like.

The trajectory and steering controller 1080 is configured to communicate a vehicle control output to the actuator system 1030. In an exemplary embodiment, the actuators 1042 include a steering control, a shifter control, a throttle control, and a brake control. The steering control may, for example, control a steering system 1024 as illustrated in FIG. 1, which includes the EPS 80 (shown in FIG. 3). The shifter control may, for example, control a transmission system 1022 as illustrated in FIG. 1. The throttle control may, for example, control a propulsion system 1020 as illustrated in FIG. 1. The brake control may, for example, control a wheel braking system 1026 as illustrated in FIG. 1.

As mentioned briefly above, the ADAS 1070 is included within the lateral vehicle control system 10. The lateral vehicle control system 10 of various embodiments of the present disclosure provide methods and systems for temperature-agnostic automated steering control operable with both torque and angle command interfaces. The methods and systems adapt steering dynamics and model parameters with respect to temperature variations. The lateral vehicle control system 10 provides an adaptive control algorithm with closed loop compensation of temperature effects in steering control feedforward and feedback loops. The method and systems modify autonomous steering control commands based on temperature variations to achieve path-tracking accuracy. Further, the methods and systems compensate for effects of temperature on automated driving lateral control performance through monitoring and reacting to the outside air temperature. The lateral vehicle control system 10 can adapt the boost behavior of the EPS system 80 and achieve a consistent actuation performance for various temperatures. The lateral vehicle control system 10 uses an offline characterization of performance of automated steering functions against temperature variations. The characterization may be produced by a systematic method to calibrate automated steering functions across the temperature spectrum.

The lateral vehicle control system 10 of the present disclosure is illustrated in greater detail in FIG. 3, in accordance with an exemplary embodiment. The lateral vehicle control system 10 includes the perception and sensor fusion system 1074, the path planning system 1078 and a trajectory and steering controller 1080. Further, the EPS system 80 and the sensing system 1028 are included in the lateral vehicle control system 10. The lateral vehicle control system 10 may control the steering of the vehicle 100 as part of various ADASs 1070 including adaptive lane centering, low speed lane centering, collision avoidance, lane keeping assist, parking assist, hands off autonomous driving and full autonomous driving.

The perception and fusion system 1074 receives image data 22 and other perception data 26 from cameras 12, LiDAR 14 and other perception devices (e.g. Radar Devices) attached to or associated with the vehicle 100. The perception and fusion system 1074 obtains the data 22, 26 and processes it to determine or measure the relative location of the vehicle 100 with respect to road features, for example, other vehicles, lane markers(s), road shoulder(s), median barrier(s), edge of the road and other objects or features. Cameras 12 may, for example, measure distance and/or relative orientation to objects, other vehicles (e.g., vehicles in front of vehicle 100 that may pose a collision threat), lane offset, heading angle, lane curvature and provide the information to the path planning system 1078 in the form of detection data 20. The detection data 20 can describe position and other state characteristics (e.g. relative velocity, orientation, state of traffic lights, etc.) of the various detected items in addition to classifying them.

The perception and sensor fusion system 1074 provides detection data 20 to the path planning system 1078. The detection data 20 may be generated based on data from the sensing system 1028, as described above, including one or more cameras 12, a global positioning system (GPS) receiver, a lidar 14, an inertial measurement unit included in the vehicle dynamics sensors 86 and vehicle Controller Area Network (CAN) data. The path planning system 1078 may further receive localization and mapping data from the positioning system 1076 (which utilizes map data 24 from the map 16). The positioning system 1076 provides a navigation function for planning a route relative to a map from a start location to a destination location in some applications of the lateral vehicle control system 10. The positioning system 1076 is able to locate the vehicle 100 relative to the route and the map. This localization and mapping data may provide a base route by which the path planning system 1078 generates more detailed instructions for autonomous driving. In particular, the path planning system 1078 further takes into account the perceived environment based on the detection data 20 such as traffic signs, obstacles, traffic, etc. The path planning system 1078 outputs a commanded trajectory 28 based at least on the detection data 20.

The path planning system 1078 plans a trajectory for the vehicle 100 taking into account the detection data 20, optionally map data from the map 16 and state data concerning the vehicle 100 (which may include vehicle dynamics data 90 from the vehicle dynamics sensors 86) to plan a path for the vehicle to avoid obstacles, stay centrally located in a lane, to navigate to a destination, etc. depending on the application. The path planning system 1078 provides a commanded trajectory 28 including, in some embodiments, at least position data and heading (or yaw) data for each time spaced data point. The lateral vehicle control system 10 selects and outputs a set of actuator commands (including a steering command 30) that simultaneously minimizes departure of the predicted position from the planned position and departure of the predicted heading from the planned heading, among other terms to be minimized to optimally control a lateral position of the vehicle 100.

An exemplary commanded trajectory 28 includes a series of waypoints making up the commanded trajectory 28. Each waypoint includes a vector of data including, for example, position data x, y (in an x (longitudinal) direction and a perpendicular y (lateral) direction), heading $\psi$, yaw rate $\dot{\psi}$ (which is a time derivative of heading), velocity $v_x$, $v_y$ (in the x and y directions) and acceleration $a_x$, $a_y$ (in the x and y directions). Each waypoint can be designated as an ith waypoint in the series. The commanded trajectory 28 thus provides a desired path for the vehicle 100 to follow.

The trajectory and steering controller 1080 is configured to receive the commanded trajectory 28, to process the commanded trajectory 28 and to output actuator commands including the steering command 30. The trajectory and steering controller 1080 aims to generate the steering command 30 to follow the commanded trajectory 28 as closely as possible whilst also taking into account other factors such as lateral stability, passenger comfort and actuator constraints. As such, the steering command 30 may not necessarily result in the vehicle 100 precisely following the requested path defined by the commanded trajectory 28.

The trajectory and steering controller 1080 includes a trajectory controller 40 and a steering angle controller 42 in some embodiments, as shown in FIG. 3. The trajectory controller 40 includes position control and curvature control algorithms. The position control algorithm generates a commanded vehicle path curvature based on a desired position of the vehicle 100 at a preview distance ahead of the vehicle 100 and associated desired heading angle at the preview distance and desired curvature at the preview distance, which are provided by the path planning system 1078 as part of the commanded trajectory 28. The position control algorithm processes this information to determine a commanded path curvature. The commanded path curvature may be limited based on lateral acceleration limits. The curvature control algorithm determines a curvature error based on actual state of the vehicle and feeds this back in determining a target road wheel angle (RWA) 44 that may also factor in bank angle compensation. The algorithms of the trajectory controller 40 determine a target RWA 44 using feedforward and feedback control loops that are derived from one or more vehicle dynamics models such as the dynamic bicycle model. The target RWA 44 is provided to the steering angle controller 42, which performs a steering angle to steering torque conversion operation as a function of a difference between the target RWA 44 and a measured RWA from the vehicle dynamics sensors 86 to generate the steering command 30. The measured RWA is illustrated in FIG. 3 as measured feedback data 46. In addition to the measured RWA, further data may be fed back for use in the one or more feedback control loops of the trajectory and steering angle controller such as measured path curvature and measured heading angle so that the trajectory and steering controller 1080 factors in path curvature error and heading angle error.

The steering command 30 may be steering torque in the present embodiment. However, other trajectory and steering controllers 1080 than the exemplary embodiment of FIG. 3 may generate the steering command 30 in the form of a steering angle or RWA command. The steering angle controller 42 may include feedforward and feedback control loops, with the functions defined thereby being constructed based on one or more vehicle dynamics models. The various gains used by the algorithms of the trajectory and steering controller 1080 may be adapted based on measured outside temperature 88 from the temperature sensor 82, as will be described further herein. The controller gains may also be dependent on vehicle velocity and/or desired path curvature. As such, a three-dimensional look-up table may be stored in memory 1046 that relates controller gain values to vehicle velocity, desired path curvature and temperature to provide varying values depending on each of these variables. A function equivalent of the look-up table relationship may also be provided.

In other embodiments, the trajectory and steering controller 1080 utilizes a Model Predictive Control (MPC) algorithm, which includes a plurality of terms representing factors that should be minimized when generating the steering command 30 such as a heading term and a trajectory term. The heading term represents a difference between the planned heading (as provided by the path planning system 1078) and current and predicted heading of the vehicle 100. The trajectory term represents a difference between the planned position (as provided by the path planning system 1078) and the current and predicted position of the vehicle 100. The trajectory and steering controller 1080 may minimize an aggregate sum of each of the terms (and further terms) over a finite number of time spaced iterations and selects the set of output commands associated with the minimum, which include the steering command 30. The MPC algorithm may obtain actuators commands by repeatedly solving an open loop finite-horizon optimal control problem. The MPC algorithm allows for real-time optimization of a given performance index while taking into account a vehicle motion model and constraints on actuators and outputs. The performance index may embody at least a differential between planned and current/predicted heading and differential between planned and current/predicted vehicle position. The vehicle position, heading and other vehicle outputs are predicted using a vehicle motion model that may be a simplified vehicle dynamics model. Any suitable vehicle motion model that is capable of predicting at least vehicle heading and vehicle position from a set of actuator commands may be used. The vehicle model may be a set of non-linear standard deferential equations or any other form, for example an RL-Model. The vehicle motion model may also predict velocity and yaw rate. The MPC algorithm applies constraints on the actuator commands to reflect physical limits of the actuator system 1030 and the planned trajectory. For example, there may be a maximum deviation from the planned trajectory as one constraint, maximum and minimum values for various actuators of the actuator system 1030, maximum rates of change for the actuators, impermissible locations for the vehicle 100 (such as overlap with a perceived obstacle), maximum and/or minimum values for outputs of the vehicle (such as speed), etc.

Another exemplary embodiment for the trajectory and steering controller 1080 is illustrated in FIG. 4. The trajectory and steering controller 1080 is configured to receive the commanded trajectory 28 and generate a steering command 30 in the form of a torque command 30a or a steering angle command 30b depending on the target variable utilized by the EPS system 80. The commanded trajectory 28 is used as a basis for determining a path following error 406 e. The path following error 406 may represent a difference between current/predicted values for vehicle heading angle, vehicle position, lateral speed, lateral acceleration and/or path curvature and corresponding measured values. The predicted values may be obtained using a vehicle dynamics model as discussed above. The trajectory and steering controller 1080 may additionally receive the following inputs:

Measured RWA 408—$\delta$
Vehicle and Road States 404—x
Vehicle Parameters 402—P
Measured Outside Temperature 88—T The vehicle and road states 404 include road data such as bank angle, which may be determined from an IMU of the vehicle dynamics sensors 86, from the map 16 or other sources. The vehicle and road states 404 include vehicle data such as current position, lateral acceleration, lateral speed, longitudinal speed, longitudinal acceleration, driver applied torque, road wheel angle, heading angle, etc. The vehicle parameters 402 include various constants such as vehicle dimensions and calibration values for vehicle dynamics models that have been identified offline or online. The measured outside temperature 88 is used to adapt functions, vehicle parameters 402 and models used by the trajectory and steering controller so that substantially consistent lateral response is provided for any given target RWA 44 or commanded trajectory 28 irrespective of OAT.

The trajectory and steering controller 1080 receives the various inputs 88, 402, 404, 406, 408 described above and processes them through a steering command generation function 410. The steering command generation function 410 may be described in a simplified, generalized form as follows:

$$\delta_{cmd} = f_{FB,1}(\dot{e},e,P,x,\dot{x},T) + f_{FF,1}(\dot{x},x,P,T) \quad \text{(equation 1)}$$

$$\tau_{cmd} = f_{FB,2}(\dot{\delta}_{cmd} - \dot{\delta}, \delta_{cmd} - \delta, P, x, T) + f_{FF,2}(\dot{\delta}_{cmd}, \delta_{cmd}, P, x, T) \quad \text{(equation 2)}$$

The steering command generation function 410 may determine a steering angle command $\delta_{cmd}$, as shown in equation 1. The steering angle command may be determined by way of a first feedback function $f_{FB,1}$, which is a function of rate of path following error $\dot{e}$, path following error e, vehicle parameters P, vehicle and road states x, rate of vehicle and road states $\dot{x}$ and measured outside temperature T. As such, the feedback loop that aims to minimize the path following error is adapted based on measured outside temperature. The steering angle command may be additionally determined by way of a first feedforward function $f_{FF,1}$, which is a function of rate of steering angle command $\dot{\delta}_{cmd}$, steering angle command $\delta_{cmd}$, vehicle parameters P, vehicle and road states x, and measured outside temperature T. As such, the feedfoward loop is also adapted based on measured outside temperature 88.

In some embodiments, the steering angle command $\delta_{cmd}$ is used by the EPS 80 as a target for steering the vehicle 100. In other embodiments, the steering angle command is converted to a torque command by way of equation 2 in an exemplary embodiment. Equation 2 includes a second feedback function $f_{FB,2}$ which is a function of a difference in rate of steering angle command $\dot{\delta}_{cmd}$ and measured rate of steering angle $\dot{\delta}$, a difference in steering angle command $\delta_{cmd}$ and measured steering angle $\delta$ as well as vehicle parameters P, vehicle and road states x, and measured outside temperature T. As such, the feedback loop that aims to minimize the steering angle error is adapted based on measured outside temperature. Equation 2 further includes a second feedforward function $f_{FF,2}$, which is a function of rate of steering angle command $\dot{\delta}_{cmd}$, steering angle command $\delta_{cmd}$, vehicle parameters P, vehicle and road states x, and measured outside temperature T. As such, the feedforward loop is adapted based on measured outside temperature 88.

The steering command generation function 410 incorporates a vehicle dynamics model to design the first and second functions $f$ for both feedback and feedforward terms. The present algorithm incorporates the measured outside temperature T to modify the vehicle dynamics model, which is used to design the control functions $f$. As illustrated and described above, one or both of any of the feedback and feedforward functions may be adjusted based on the measured outside temperature 88. In one embodiment, the vehicle dynamics models may be identified offline under different outside temperatures and the identified parameters of the vehicle dynamics models (as incorporated into equations 1 and 2) may be stored in memory 1046 for retrieval depending on the measured outside temperature 88. In this way, consistent lateral performance is assured by the steering command 30 being adapted as the measured outside temperature 88 changes.

The EPS system 80 outputs a motor torque to a vehicle plant (not shown) based on the steering command 30. The motor torque boosts or wholly controls an electric power steering motor that actuates steering of wheels 1016 and/or 1018 of the vehicle 100.

The embodiments described hereinbefore are described in the context of an ADAS system 1070 that plans a path in response to detection data 20. In other embodiments, the steering command 30 is generated based on a sensed driver applied torque, which is a torque applied to the steering wheel of the steering system 1024 by the driver. The EPS system 80 includes a motor that applies and calculates a magnitude of torque assistance to apply to a steering column or steering rack based on the sensed driver applied torque. The EPS system 80 includes logic to boost a driver's commands. The boost may be a nonlinear function for manual driving based on at least steering angle, vehicle speed, driver command torque, and optionally other sensed variables. In an exemplary embodiment of the present disclosure, the boost function is adapted based on the measured outside temperature 88 so that feel for the driver is consistent for any given set of input variables (steering angle, vehicle speed, driver applied torque, etc.) irrespective of OAT.

A boost function may also be included in the trajectory and steering controller 1080 in ADAS applications that plan a path based on detection data 20 (e.g. collision avoidance, lane keep, lane centering, fully autonomous driving, etc.). For such ADAS systems 1070, a linear boost function (or a linearizer boost function to linearize an existing non-linear boost function to counter the effects of the nonlinear boost of the EPS system 80) is included in the trajectory and steering controller 1080. The linear boost function or linearizer boost function may be adapted based on measured outside temperature 88 to provide for consistent lateral response irrespective of variations in OAT.

The exemplary embodiment of the lateral vehicle control system 10 of FIG. 3 is included in the ADAS 1070. In some embodiments, the ADAS 1070 is configured to execute steering and speed control maneuvers, amongst other possible autonomous driving possibilities, to avoid collisions and to move cooperatively with tracked objects based in part on the steering command 30. The ADAS 1070 operates known autonomous vehicle control computer instructions through a processor based in part on the steering command 30, as described above with respect to FIG. 2.

FIG. 5 shows a flow chart describing exemplary method aspects of the present disclosure for controlling the vehicle 100. The steps of the flow chart of FIG. 5 can be implemented by computer program instructions stored on a computer readable medium executed by a processor such as the at least one processor 1044. The steps may be carried out by the modules, systems and controllers described with respect to FIGS. 3 and 4 for example and may also take in further aspects of the ADAS 1070 described with respect to FIG. 2.

The flow chart describes an exemplary method 500 for laterally controlling the vehicle 100. Steps 510, 520 and 530 relate to applications in which objects are detected using perception data and a path is planned based thereon. However, other applications such as those in which manual driving is boosted by the EPS system 80 may begin at step 540. Such methods may use an automated lateral control algorithm that pertains to boosting driver applied steering torque whilst factoring in certain vehicle dynamics data 90 such as vehicle speed as well as other measured data like steering angle and driver applied torque. In these applications, the boost function is adapted based on the measured outside temperature 88.

In step 510, perception data is received, which may be in the form of image data 22 and other perception data 26 from LiDAR 14, RADAR (not shown) and/or ultrasonic sensor, etc. In step 520, the perception data is fused and processed to detect objects such as other vehicles and pedestrians and other environmental features such a road lines, lanes, road signs, traffic lights, etc. Step 520 produces detection data 20. In step 530, a vehicle path is planned based on the detection data 20. Depending on the application, the vehicle path may be determined to avoid obstacles that have been detected, to keep the vehicle 100 in the center of a lane, to change lanes, to take a turn and/or to enter a parking space, etc. The path planning produces the commanded trajectory 28, which describes a desired path including such variables as desired location, desired heading angle, desired lateral acceleration, desired path curvature, etc. at each of a series of waypoints ahead of the vehicle 100.

In step 540, a steering command 30 is generated based on the commanded trajectory 28 in an adaptive way based on the measured outside temperature 88. The steering command 30 can be generated using various trajectory and steering control algorithms that may have feedforward and/or feedback control loops. In embodiments, the trajectory and steering control algorithm factors in an error between one or more variables in a desired path according to the commanded trajectory 28 and corresponding measured and predicted values. Further, the trajectory and steering control algorithms consider an error between the steering command 30 and a corresponding measured steering command. In this way, path and steering errors can be minimized in generating the steering commands. The trajectory and steering control algorithm includes one or more functions that are designed based on a vehicle dynamics model. Step 540 is adaptive based on the measured outside temperature 88 by adapting the trajectory and steering control algorithm in some way. For example, feedback and/or feedback functions may be adapted. Parameters of models used in the trajectory and steering control function can be modified. Gains used in the functions may be adapted. In some embodiments, a boost linearizer function may be included in the trajectory and steering control function to make linear a non-linear function of the EPS system 80 relating at least vehicle speed and boost torque applied by the EPS system 80. The boost linearizer function may be adapted based on the measured outside temperature 88. The adaptation or adaptations may be applied using a function relating changes to a feature of the trajectory and steering control algorithm to temperature or by looking up the changes in memory based on the measured outside temperature 88. The adaptations may be determined offline by testing various lateral responses of the vehicle 100 under different temperature conditions and adapting features of the trajectory and steering control algorithm to provide consistent lateral response performance for the varying temperatures.

In step 550, the EPS system 80 is actuated based on the steering command 30 generated in step 540. The steering command 30 may describe a target steering angle or target steering torque. The EPS system 80 actuates the braking system 1026 according to the steering command 30, which involves operation of an electric motor to apply torque to a steering column or steering rack of the vehicle plant of the vehicle 100.

Systems and methods described herein may improve performance of automated driving lateral controls in various temperature conditions, provide accurate lateral control despite undesirable effects of extreme temperatures on steering performance, improves customer experience providing consistent steering feel and lateral control comfort, and simplify a calibration process for various environmental conditions and operating regions.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A vehicle control system for a vehicle, comprising:
   an Electric Power Steering System (EPS);
   a sensor system includes at least one vehicle dynamics sensor configured to provide vehicle dynamics data and at least one temperature sensor configured to provide measured outside temperature;
   at least one processor in operable communication with the EPS and the sensor system, the at least one processor configured to execute program instructions, wherein the program instructions are configured to cause the at least one processor to:
      execute an automated lateral control algorithm based on the vehicle dynamics data to generate a steering command;
      adapt the automated lateral control algorithm based on the measured outside temperature so that the steering command compensates for changing lateral response of the vehicle as a result of changing environmental temperature; and
      provide the steering command to the EPS, wherein the EPS is configured to laterally control the vehicle based on the steering command.

2. The vehicle control system of claim 1, wherein the sensor system includes at least one perception sensor providing perception data and wherein the program instructions are configured to cause the at least one processor to:
   execute a path planning algorithm to determine a commanded trajectory based on the perception data; and
   execute a trajectory and steering control algorithm as part of the automated lateral control algorithm that generates the steering command based on the commanded trajectory;
   wherein adapting the automated lateral control algorithm includes adapting the trajectory and steering control algorithm based on the measured outside temperature so that the steering command compensates for changing lateral response of the vehicle as a result of changing environmental temperature.

3. The vehicle control system of claim 2, wherein the trajectory and steering control algorithm includes a trajectory control algorithm configured to provide a target hand wheel angle based on the commanded trajectory and a steering angle controller configured to provide a commanded torque or commanded hand wheel angle to the EPS based on the target hand wheel angle.

4. The vehicle control system of claim 1, wherein adapting the automated lateral control algorithm based on the measured outside temperature includes gain scheduling.

5. The vehicle control system of claim 1, wherein the automated lateral control algorithm utilizes a vehicle dynamics model to generate the steering command and wherein adapting the automated lateral control algorithm based on the measured outside temperature includes adapting the vehicle dynamics model.

6. The vehicle control system of claim 1, comprising a boost linearizer function configured to make linear a non-linear steering assist booster of the EPS, wherein adapting the automated lateral control algorithm based on the measured outside temperature includes adapting the boost linearizer function.

7. The vehicle control system of claim 1, wherein adapting the automated lateral control algorithm based on the measured outside temperature includes obtaining temperature compensated parameters for use by the automated lateral control algorithm that vary based on the measured outside temperature.

8. The vehicle control system of claim 1, wherein the lateral control algorithm includes a feedforward and a feedback control loop and wherein adapting the automated lateral control algorithm based on the measured outside temperature includes adapting at least one of the feedforward and the feedback control loops.

9. The vehicle control system of claim 1, wherein the sensor system measures a driver applied steering torque and the automated lateral control algorithm determines a boosted torque based on the driver applied steering torque and the measured outside air temperature, wherein providing the steering command to the EPS includes providing the boosted torque.

10. A method of controlling a vehicle, the vehicle comprising an Electric Power Steering System (EPS), a sensor system including at least one vehicle dynamics sensor providing vehicle dynamics data and at least one temperature sensor providing measured outside temperature, wherein the method comprises:
    executing, via at least one processor, an automated lateral control algorithm based on the vehicle dynamics data to generate a steering command;
    adapting, via the at least one processor, the automated lateral control algorithm based on the measured outside temperature so that the steering command compensates for changing lateral response of the vehicle as a result of changing environmental temperature; and
    providing, via the at least one processor, the steering command to the EPS, wherein the EPS laterally controls the vehicle based on the steering command.

11. The method of claim 10, wherein the sensor system includes at least one perception sensor providing perception data and wherein method comprises:
    executing, via the at least one processor, a path planning algorithm to determine a commanded trajectory based on the perception data; and
    executing, via the at least one processor, a trajectory and steering control algorithm as part of the automated lateral control algorithm that generates the steering command based on the commanded trajectory;
    wherein adapting the automated lateral control algorithm includes adapting the trajectory and steering control algorithm based on the measured outside temperature so that the steering command compensates for changing lateral response of the vehicle as a result of changing environmental temperature.

12. The method of claim 11, wherein the trajectory and steering control algorithm includes a trajectory control algorithm providing a target hand wheel angle based on the commanded trajectory and a steering angle controller providing a commanded torque or commanded hand wheel angle to the EPS based on the target hand wheel angle.

13. The method of claim 10, wherein adapting the automated lateral control algorithm based on the measured outside temperature includes gain scheduling.

14. The method of claim 10, wherein the automated lateral control algorithm utilizes a vehicle dynamics model to generate the steering command and wherein adapting the automated lateral control algorithm based on the measured outside temperature includes adapting the vehicle dynamics model.

15. The method of claim 10, comprising utilizing a boost linearizer function to make linear a non-linear steering assist booster of the EPS, wherein adapting the automated lateral control algorithm based on the measured outside temperature includes adapting the boost linearizer function.

16. The method of claim 10, wherein adapting the automated lateral control algorithm based on the measured outside temperature includes obtaining temperature compensated parameters for use by the automated lateral control algorithm that vary based on the measured outside temperature.

17. The method of claim 10, wherein the lateral control algorithm includes a feedforward and a feedback control loop and wherein adapting the automated lateral control algorithm based on the measured outside temperature includes adapting at least one of the feedforward and the feedback control loops.

18. The method of claim 10, wherein the sensor system measures a driver applied steering torque and the automated lateral control algorithm determines a boosted torque based on the driver applied steering torque and the outside air temperature, wherein providing the steering command to the EPS includes providing the boosted torque.

19. The method of claim 10, wherein the lateral response of the vehicle changes with environmental temperature as a result of, at least in part, change in viscosity of lubricants and change in friction along a steering chain from a steering actuator to wheels of the vehicle and change in tire pressure.

20. A vehicle, comprising:
an Electric Power Steering System (EPS);
a sensor system including at least one vehicle dynamics sensor configured to provide vehicle dynamics data and at least one temperature sensor configured to provide measured outside temperature;
at least one processor in operable communication with the EPS and the sensor system, the at least one processor configured to execute program instructions, wherein the program instructions are configured to cause the at least one processor to:
execute an automated lateral control algorithm based on the vehicle dynamics data to generate a steering command;
adapt the automated lateral control algorithm based on the measured outside temperature so that the steering command compensates for changing lateral response of the vehicle as a result of changing environmental temperature; and
provide the steering command to the EPS, wherein the EPS is configured to laterally control the vehicle based on the steering command.

* * * * *